United States Patent [19]
Gitlin et al.

[11] Patent Number: 5,856,971
[45] Date of Patent: Jan. 5, 1999

[54] CODE DIVISION MULTIPLE ACCESS SYSTEM PROVIDING VARIABLE DATA RATE ACCESS TO A USER

[75] Inventors: Richard Dennis Gitlin, Little Silver; Chih-Lin I, Manalapan, both of N.J.

[73] Assignee: AT&T Corp, Middletown, N.J.

[21] Appl. No.: 504,481

[22] Filed: Jul. 20, 1995

Related U.S. Application Data

[63] Continuation of Ser. No. 242,471, May 13, 1994, Pat. No. 5,442,625.

[51] Int. Cl.⁶ .................................................. H04J 13/00
[52] U.S. Cl. ............................................................ 370/335
[58] Field of Search ............................. 370/18, 84, 95.1, 370/95.3, 329, 335, 342, 341, 441, 431, 320, 468; 375/200, 206

[56] References Cited

U.S. PATENT DOCUMENTS

| | | | |
|---|---|---|---|
| 4,802,189 | 1/1989 | Wedler | 375/37 |
| 4,882,579 | 11/1989 | Siwiak | 370/342 |
| 5,166,951 | 11/1992 | Schidling | 375/205 |
| 5,442,625 | 8/1995 | Gitlin et al. | 370/18 |

OTHER PUBLICATIONS

Wi–LAN, Inc., "Multicode Direct Sequence Spread Spectrum," Technical Bulletin #3, Oct. 1993. Cited in specification; technological background.

"Wireless Network At 20 Mbps," Newsbytes News Network, Sep. 29, 1993. Technological background.

*Primary Examiner*—Ajit Patel
*Attorney, Agent, or Firm*—Jose R. de la Rosa

[57] ABSTRACT

A multi-code code division multiple access system allows a user at a radio transmitter unit to dynamically change its source data bit rate. In response to a user input selecting one of said plurality of source bit rates, an adjustable coding means in the transmitter spreads and transmits the user's digital bit stream received at the selected bit rate to a channel bit rate which at least equals the highest bit rate of said plurality of source bit rates. The plurality of source bit rates includes a basic bit rate R and at least one bit rate which is a multiple M of the basic bit rate R, where M is an integer of at least 1. The user's input selects a particular user source bit rate by identifying a basic bit rate multiple M to a base station that is to receive the transmission.

16 Claims, 6 Drawing Sheets

CODE DIVISION MULTIPLE ACCESS SYSTEM PROVIDING VARIABLE DATA RATE ACCESS TO A USER

This is a continuation of application Ser. No. 08/242,471 filed May 13, 1994 now U.S. Pat. No. 5,442,625.

FIELD OF THE INVENTION

This invention relates to code division multiple access (CDMA) systems and, more particularly, to a CDMA system for providing a user with variable and dynamic bandwidth capacity access.

BACKGROUND OF THE INVENTION

In future wireless networks, a large variety of services, such as voice/video/data/image, are expected. The most precious resource in most wireless systems is the radio spectrum. To maximize its effective use, packet switched wireless access using code division multiple access (CDMA) has been pursued and offers increased service quality and transmission bandwidth. These CDMA systems provide reduced multiple path distortion and co-channel interference, and avoid the need for frequency planning that is common with frequency division multiple access (FDMA) and time division multiple access (TDMA) systems.

In a CDMA system, a unique binary spreading sequence (a code) is assigned for each call to each user. Multiplied by the assigned code, the user's signal is "spread" onto a channel bandwidth much wider than the user signal bandwidth. The ratio of the system channel bandwidth to the user's bandwidth is commonly called "the spreading gain." All active users share the same system channel bandwidth frequency spectrum at the same time. Given a required signal-to-interference (S/I), the equivalent system capacity is proportional to the spreading gain. The signal of each user is separated from the others at the receiver by using a correlator keyed with the associated code sequence to "despread" the desired signal.

In these CDMA systems, there is a continuing need to increase the performance of the system by accommodating users having different source rates.

SUMMARY OF THE INVENTION

In accordance with the present invention, a multi-code CDMA system allows a user at a radio transmitter unit to dynamically change its source data rate. In response to a user input selecting one of said plurality of source bit rates, an adjustable coding means spreads and transmits the user's digital information received at the selected bit rate to a channel bit rate which at least equals the highest bit rate of said plurality of source bit rates. According to one feature, the plurality of source bit rates includes a basic bit rate R and at least one bit rate which is a multiple M of the basic bit rate R, where M is an integer of at least 1. The user's input selects a particular user source bit rate by identifying a basic bit rate multiple M to a base station that is to receive the transmission.

DETAILED DESCRIPTION

Figure 1:
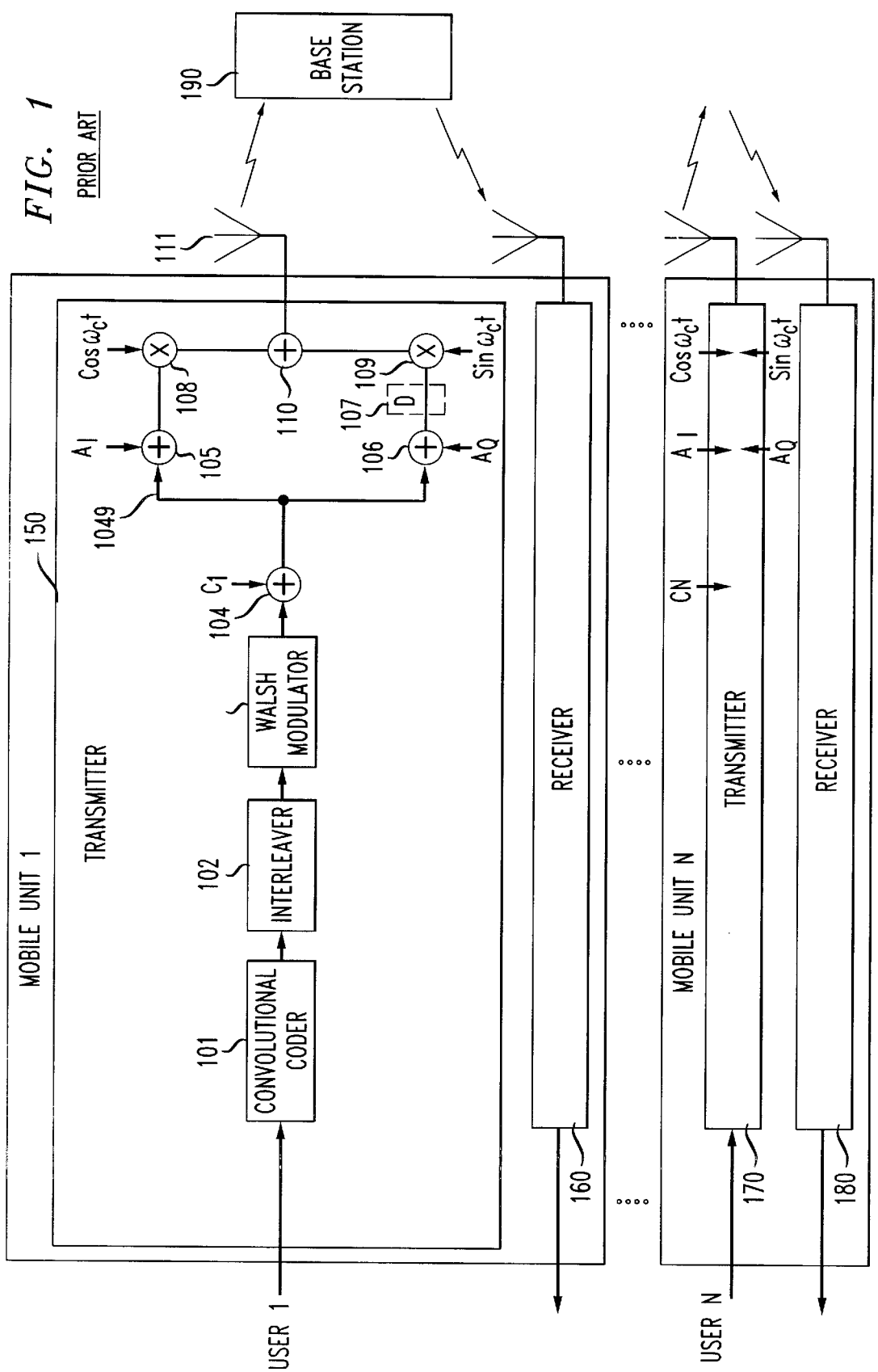
FIG. 1 shows a prior art CDMA system.

With reference to FIG. 1, we describe a prior art CDMA system. The CDMA system includes a plurality of mobile units (1–N) which enables a plurality of users (1–N) to communicate with a base unit 190 at one cell site. Illustratively, a block diagram of mobile unit 1 includes a transmitter unit 150 and a receiver unit 160. The transmitter unit 150 includes a convolutional coder 101 which receives digital information (or data signals) from user 1 at a first data bit rate. The output of convolutional coder 101 is coupled to interleaver 102 and then to a Walsh modulator 103, all of which are well known in the prior art. The output of modulator 103 is outputted into code spreader 104, which spreads the first data bit rate signal into a channel bit rate using a code $C_1$ which is unique to user 1. The output signal 104a of code spreader 104 is coupled to coders 105 and 106. In coder 105, an in-phase code $A_I$ further encodes the signal 104a. Similarly, coder 106 further encodes the signal 104a using a quadrature-phase code $A_Q$. The codes $A_I$ and $A_Q$ are common to mobile units 1–N, but are unique to the cell site base unit 190 which serves mobile units 1–N. This ensures that mobile units 1–N can only communicate with base station 190.

The output of coder 105 is used to modulate the carrier signal Cos $\omega_c t$ in modulator 108. The output of coder 106 is used to modulate the carrier signal Sin $\omega_c t$ in modulator 109. In certain applications, an optional delay unit 107 may be utilized to provide better spectral shaping. The output of modulators 108 and 109 are radio frequency signals which are combined in combiner 110 and transmitted via antenna 111 over the air to base unit 190.

The base unit 190 transmits at a different carrier frequency which is received and decoded by mobile units 1–N. In our illustrative example, receiver 160 of mobile unit 1 includes a demodulator (not shown) to demodulate the carrier frequency to obtain a channel bit rate signal which is decoded using codes $A_I$ and $A_Q$ and then de-spread using the associated code sequence $C_1$ to obtain the information data signal to be outputted to user 1.

The base unit 190 operates in a similar manner to receiver 160 of mobile unit 1 to receive, decode and de-spread the user 1 information data signal. Similarly, the other mobile units, illustratively represented by mobile unit N, operate in the same manner as mobile unit 1, except that user N has a unique code CN to distinguish it from user 1. In mobile unit N, the in-phase and quadrature codes $A_I$ and $A_Q$, respectively, as well as the carrier frequency $f_c$ are the same as used for mobile unit 1.

When a higher data transmission rate is desired, one prior art arrangement provides the user a multi-code mobile unit having a fixed number of multiple transmitters and receiver units, each using a different spreading code. Thus, for example, if a user required twice the bandwidth, the user terminal would include two transmitter units 150 and two receiver units 160, which operate using different codes $C_1$ and $C_2$. Such an arrangement is described in Wi-LAN Inc. Technical Bulletin No. 3 dated October 1993 and entitled "Multicode Direct Sequence Spread Spectrum." In such an arrangement, however, the user is allocated a predefined fixed bandwidth and all users, when they transmit, would transmit at the same fixed source rate.

Figure 2:
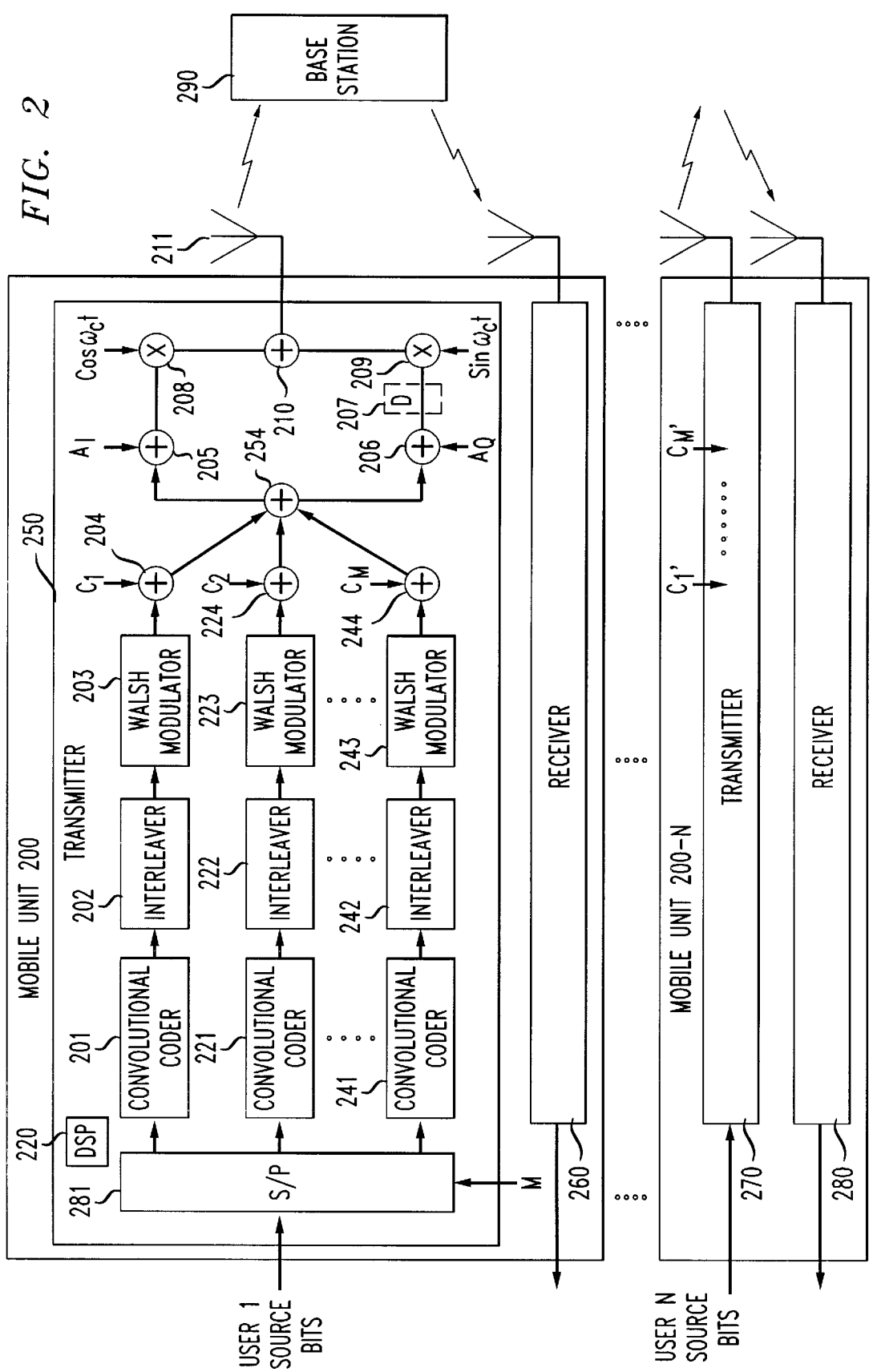
FIG. 2 shows a block diagram of a first embodiment of a transmitter unit of a multi-code CDMA system in accordance with the present invention.

With reference to FIG. 2, we describe our dynamic multi-code code division multiple access (MC-CDMA) system. In FIG. 2, the units 205–211 operate in the same manner as the previously described units 105–111 of FIG. 1 and coder units 201–204, 221–224, and 241–244 operate the same as coder units 101–104 of FIG. 1. The units 280, 201–204, and 221–224 may each be implemented using a Digital Signal Processor (DSP) or may be combined in one or more DSPs. Illustratively, the DSP is shown as a separate unit 220 which controls the mobile unit 200. The combiner 254 combines the output of code spreaders 204, 224 and 244. The serial-to-parallel unit 281 converts a user's serial digital information input, which may be up to $M_{max}$ times the basic source rate R (where $M_{max} \cdot R \leq$ channel rate), into M data streams (where M is an integer $\leq M_{max}$) each of which is encoded using one of the coder units (e.g., 201–204). The variable M is selected by a user and/or the base station 290 depending on system status, as will be discussed in a later paragraph. It should be noted that the Walsh modulators 203, 223 and 243 are optional, to improve the required signal-to-interference ratio, and in accordance with an aspect of the invention may be eliminated to improve the bandwidth multiple $M_{max}$.

In an MC-CDMA system of FIG. 2, if a user 1 requests (and is allowed by the base station 290) M times the basic source rate R, mobile unit 1 converts the user digital stream (using serial-to-parallel unit 280) into M basic rate streams. Each of the basic rate streams is encoded using a different code ($C_1$–$C_M$) and they are superimposed together (using combiner 254) and up-converted (using units 208, 209) for radio transmission to the base station 290. The codes $C_2$–$C_M$ are derived from $C_1$ using a subcode concatenation that is described in a later paragraph.

As shown in FIG. 2, such a system does not require modification to the phase encoders 205, 206 or to the RF modulators 208, 209, except for using M times the transmission power (in unit 210) to satisfy the signal-to-interference requirements. All additional processing needed in the MC-CDMA mobile unit 1 is done in the baseband region using digital signal processors (DSPs). As will be described in a later paragraph, each mobile unit 200 through 200–N is assigned a different primary code $C_1 \ldots C_1'$ by base station 290.

Figure 3:
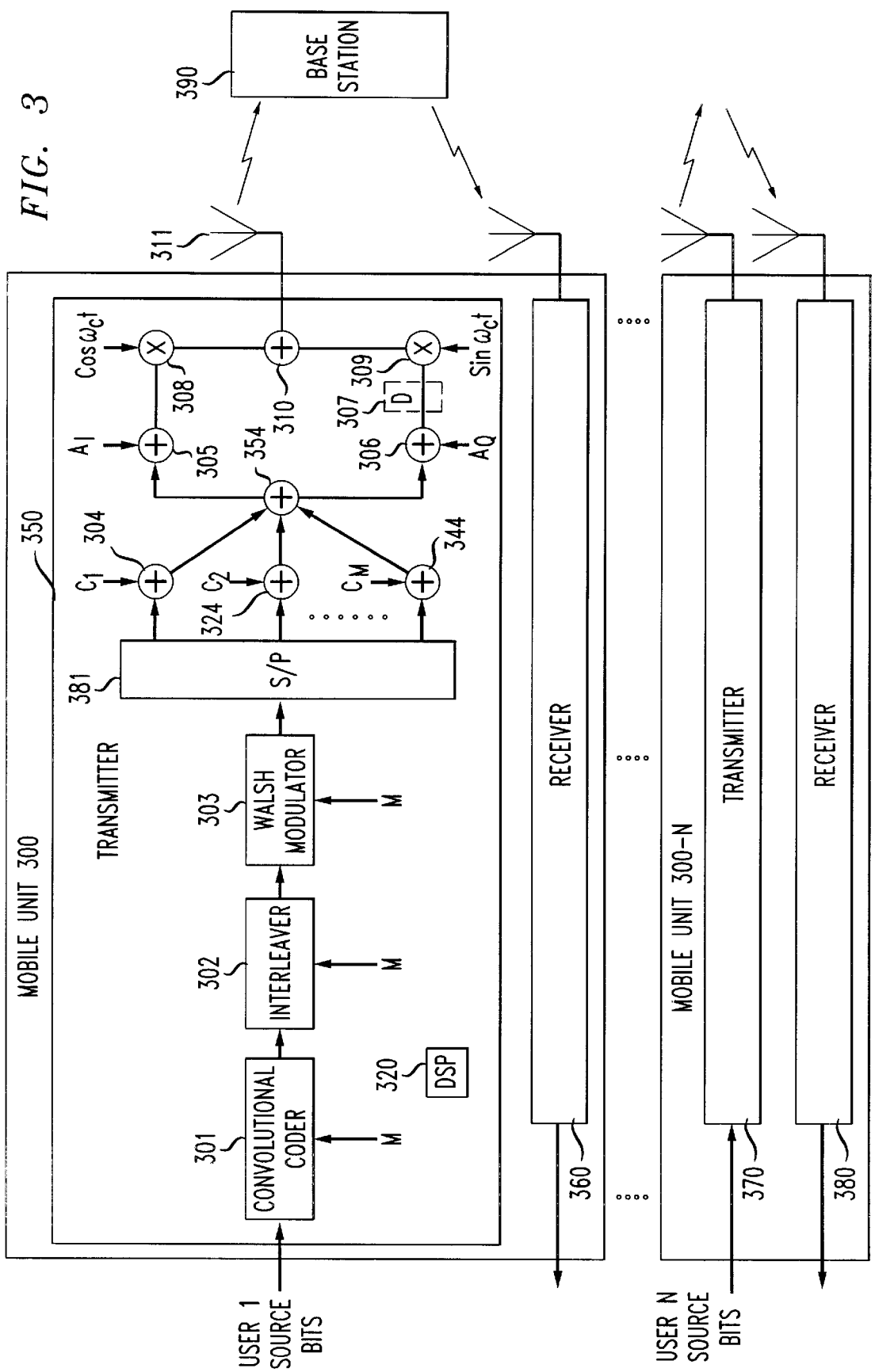
FIG. 3 shows a block diagram of a second embodiment of a transmitter unit of a multi-code CDMA system.

In an alternate embodiment shown in FIG. 3, variable rate convolutional coder, interleaver and Walsh modulator (units 301–303) can be utilized in the MC-CDMA mobile unit 300. In such an arrangement, the bandwidth of units 301–303 is set by the input M. The serial-to-parallel unit 381 is connected to the output of Walsh modulator 303 and converts the user's input digital information stream into M basic data rate serial information streams. The remaining units 304 through 311, 324, 344 and 354 function in the same manner as units 204 through 211, 224, 244 and 254 as previously described in FIG. 2. The receiver unit 360 operates in the same manner as unit 260 of FIG. 2.

Figure 4:
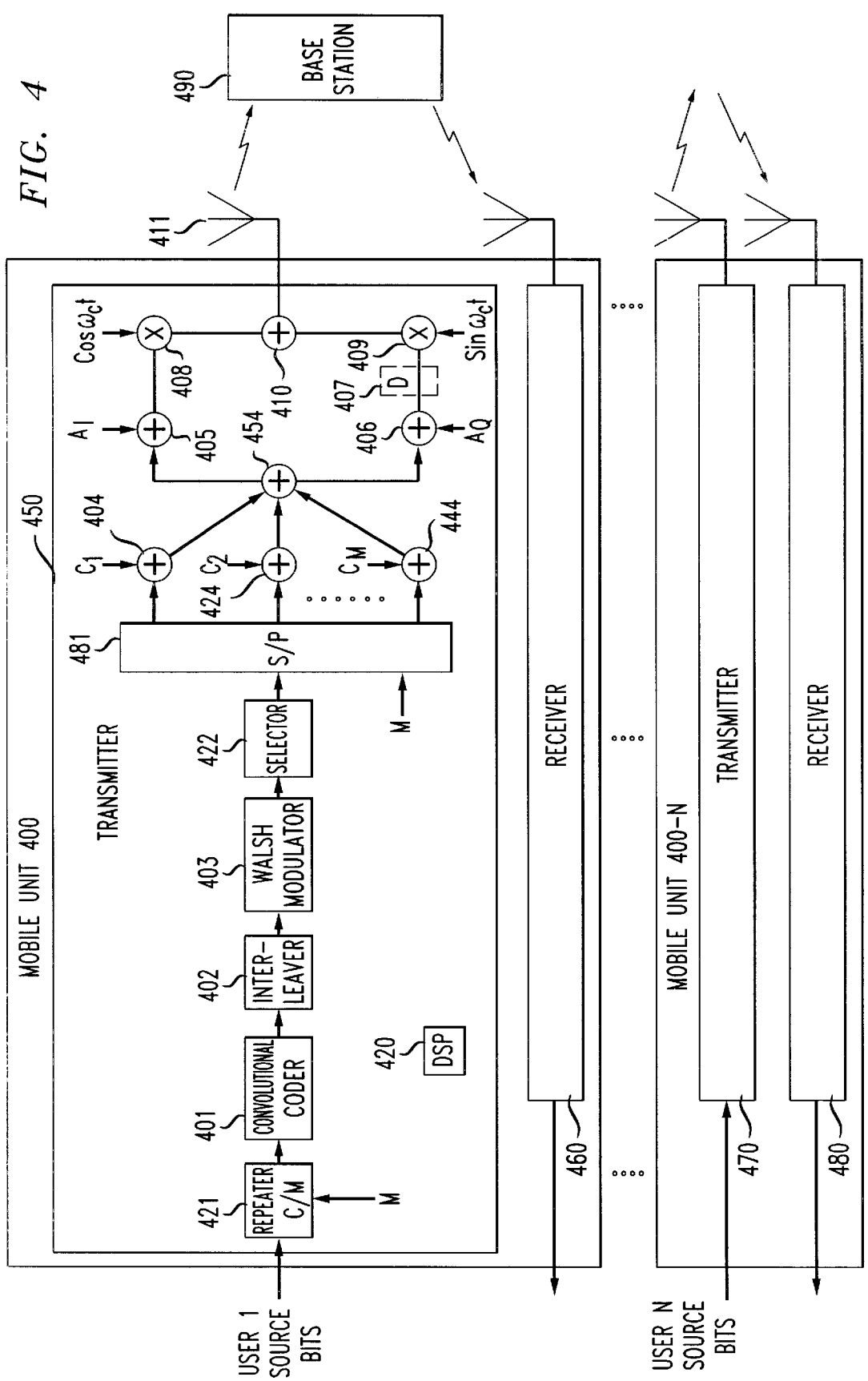
FIG. 4 shows a block diagram of a third embodiment of a transmitter unit of a multi-code CDMA system.

An additional embodiment shown in FIG. 4 describes the use of a convolutional coder, interleaver and Walsh modulator (units 401–403) which operate at a constant chip data source rate which is C times the basic data rate R. Because units 401–403 operate at a constant chip rate, they are more simply realized. The user's input digital information stream (at a data rate which is equal to M times the basic data rate R) is inputted to a repeater 450. The repeater 450 multiplies the user digital information stream (at a data rate of M times R) by a factor C/M such that the resulting data bit rate is equal to C times the basic data bit rate R. The random selector circuit 422 connects to the output of Walsh modulator 403 and randomly selects one of the C/M blocks of data. The output of selector circuit 422 is then inputted into serial-to-parallel unit 481 which operates the same as unit 381 of FIG. 3 to generate M data streams. Similarly, the units 404 through 411, 424 and 444 operate in the same manner as units 304 through 311, 324 and 344 of FIG. 3. The receiver 460 operates in the same manner as unit 360 of FIG. 3.

Rate Quantization

On the transmitter side, the actual user source bit rate does not have to be an integer multiple of the basic rate R. Each code ($C_1$–$C_M$) in MC-CDMA carries a basic rate R. M codes in parallel provide a single user M times the basic rate R capability. If one of the codes is equipped with sub-rate capability (i.e., variable spreading gain to provide ½ rate, ¼ rate, etc.), then there is a much finer quantization in terms of the source bit rate offering to the user. Thus, for example, the user would be able to transmit at 3.25 times the basic rate B.

Synchronization/Acquisition

On the receiver side, the synchronization/acquisition subsystem is very demanding even for regular CDMA systems. The MC-CDMA receiver does not require an M-fold complexity increase in synchronization/acquisition. Since the multipath/delay spread suffered by signals carried on the parallel codes to/from one user would be exactly the same, one well-known searcher circuit for acquisition will suffice for the multiple paths receiver (RAKE) fingers of all the parallel codes.

Subcode Concatenation

To avoid the self-interference that a user employing multiple codes may incur, the present invention provides a subcode concatenation scheme to generate additional codes for the user. The scheme operates as follows: Each user admitted into the system has a primary code assigned to it by the base station. The primary codes (i.e., $C_1$, $C_1'$, etc.) of different users are PN codes, i.e., not orthogonal among different users. The multiple codes to/from one user can and should be made orthogonal. If $C_1$ is the primary code of a user and the user requires a higher rate, the additional codes, $C_i$, will be derived from $C_1$ by $C_i = C_1 \times D_i$, where $D_i \perp D_j$, i≠j. Obviously, $C_i \perp C_j$, i≠j. This orthogonality is maintained at the receiver since the propagation variations on the parallel codes are the same. In addition to the ability of eliminating self-interference, this scheme helps simplify dynamic access in the sense that explicit multiple code negotiation is not needed. The latter will be made clear in the next section.

Dynamic Access Control

To provide the user dynamic bandwidth access control between bursts, two different approaches may be taken: one uses a demand assignment approach; another uses a probabilistic approach.

Taking a demand assignment approach, users (i.e., mobile units) with data bursts to transmit or users with increased source rates must make requests and wait for assignment by the base station. In conventional orthogonal systems, the assignment (e.g., using well-known RAMA/TRAMA access protocols) gives specific time slots and/or carriers to the user. In our MC-CDMA system, only the number of codes needs to be dynamically assigned by the base station. Each user has a unique primary code, i.e., $C_1$, assigned to it at call setup time. When a user is idle, a very low rate (sub-rate) signaling channel is maintained using its primary code. Not only does this sub-rate channel facilitate synchronization and power control procedures, but also it is used to make multiple code requests prior to a burst transmission. Depending on the user need and the uplink load status, an assignment is made to the requesting user. Upon receiving the number assignment from the base station, the user utilizes subcode concatenation to locally generate the corresponding number of codes for its transmission while the receiver at the base station does the same. There is no need for explicit code negotiation. The user, then, transmits at a power level adjusted according to the number of codes it uses as well as the QOS it requires.

The demand assignment access described above uses transmitter-oriented codes. By way of the low-rate maintenance channel, it assures continuous synchronization and power control. This approach requires a dedicated receiver and a dedicated maintenance channel for every user admitted into the system. Alternatively, a common code or a few common codes can be reserved for the burst access request by all users. Such access with receiver-oriented codes will do away with the dedicated resources. However, this approach has the disadvantage of a very significant burst access delay due to access collision as well as the time needed to re-acquire synchronization and power control for every burst.

Taking the probabilistic approach, adaptive access control can be employed. One such technique is described in the co-pending, commonly assigned U.S. patent application entitled "Controlling Power And Access Of Wireless Devices To Base Stations Which Use Coded-Division Multiple Access," Ser. No. 08/234,757, filed Apr. 28, 1994, and incorporated by reference herein. The base station broadcasts to the mobile units the current uplink load information. Users that have data bursts to transmit will then make probabilistic decisions on whether to transmit. For the decision-making, one useful criterion is that the conditional expected load, given the current load, is optimized. Another criterion is that the conditional probability of the system overload, given the current load, is optimized. As described in the above-cited application, priority for users with on-going bursts over users with new bursts may be desirable and can be incorporated in this control mechanism. Furthermore, since MC-CDMA users are equipped with a variable rate capability, the decision does not have to be the probability of transmission. Instead, given the current load information, a user can decide to transmit at a lower, yet non-zero, source rate by using a fewer number of codes. The probabilistic approach is attractive in that the user access can be instantaneous, and no central controller is required to dynamically assign spectral resource among users in the cell. The disadvantage of this approach is that the system overload occurs with non-zero probability, which will degrade the overall spectral efficiency.

Figure 5:
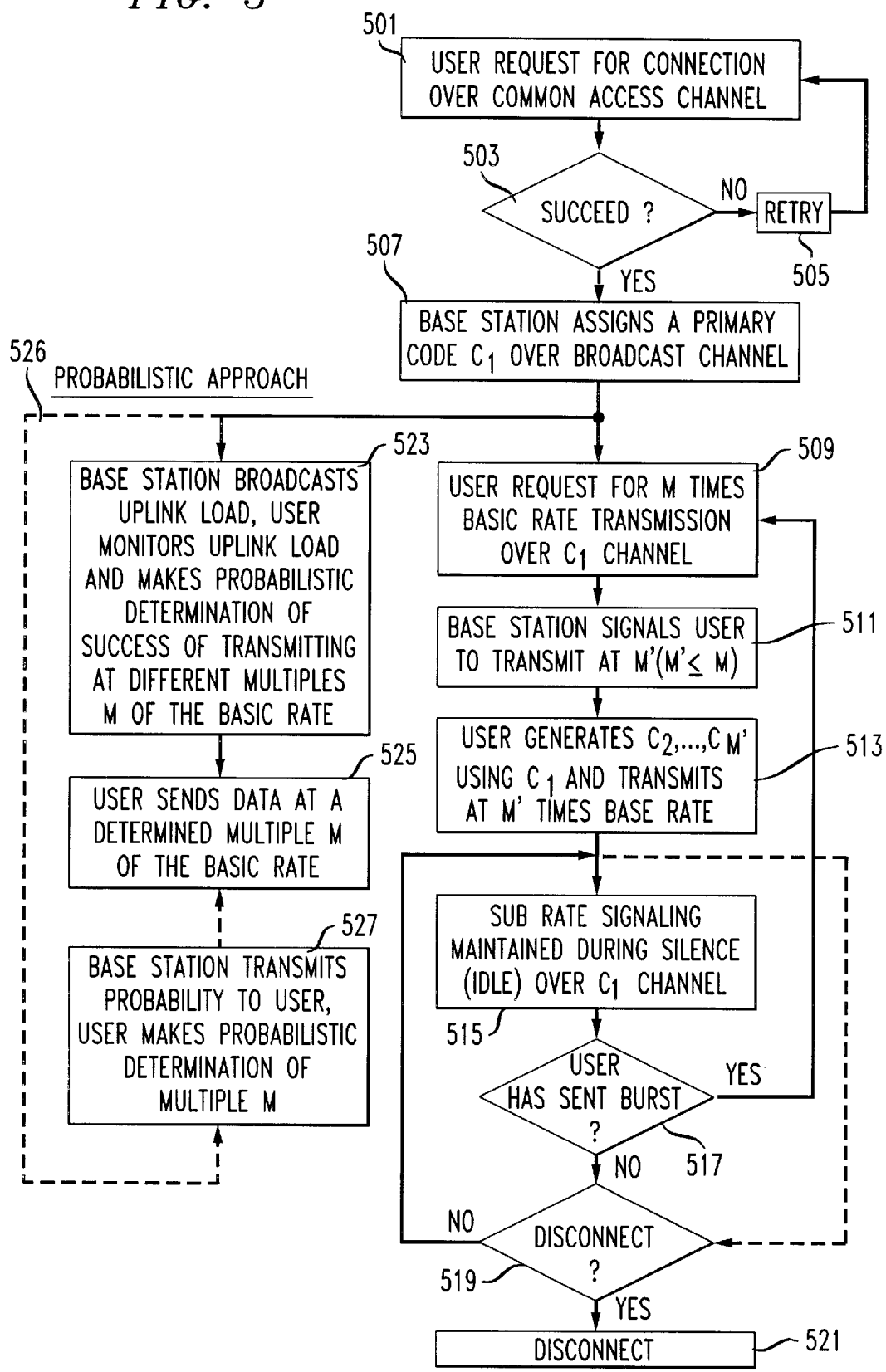
FIG. 5 shows a flow chart describing how a user can dynamically change the source data bit transmission rate of the transmitter unit.

With reference to the flow chart of FIG. 5, we describe an illustrative sequence of system operations for both the demand assignment and probabilistic approach. In step 501, the user inputs a request for a connection over a common access channel used for communications with the base station. Communications between a mobile unit and the base station may use the previously described RAMA/TRAMA protocol or other access protocols. In step 503, if the connection is not successful, it is re-tried in step 505. If it is successful, then in step 507 the base station assigns a primary code $C_1$ to the mobile unit over the broadcast channel. The base station prevents collision of transmissions from each of the mobile units by selecting unique primary codes for each mobile unit which is active. Thus, for example, one mobile unit may be assigned a primary code $C_1$; another is assigned a primary code $C_1'$.

Returning to our example, following step 507, the user can then communicate to the base station at the basic rate R using the primary code $C_1$. If the user desires to transmit at other than the basic rate, a request is made as is shown in step 509. In step 509, the user requests M times the basic rate R bandwidth for communications to the base station. Such additional bandwidth may be required by a user that transmits in a burst data mode. The base station, depending on the available bandwidth not presently being utilized by other mobile units, may allow the user to transmit at M' times the basic rate R (where M' is less than or equal to M). In step 513 when the user receives permission to transmit at M' times the basic rate R, the user generates the codes $C_2$ through $C_{M'}$ using the previously assigned primary code $C_1$.

At the end of a data burst, when the user returns to an idle mode, sub-rate signaling is maintained over the $C_1$ channel. In step 517, it is determined if the user has a new data burst. If the user has a new data burst, control returns to step 509. If there is no new data burst, then in step 519 it is determined whether or not the communications channel should be disconnected, step 521. If the user does not wish to disconnect, control returns to step 515.

For users operating in an isochronous mode (i.e., user is sending continuous data transmissions), the path 522 would be substituted for steps 515 and 517.

If the probabilistic approach is used by a user, then the following sequence of steps is followed. Following step 507, the base station, in step 523, broadcasts the uplink load to all users on the system. The user monitors the uplink load and makes a probabilistic determination of being able to transmit at a multiple M of the basic rate R. One criterion for the decision making could be that the conditional expected load, given a current uplink load, is optimized. Furthermore, given the current uplink load information, a user could then decide to transmit at a lower, yet non-zero, source data rate by using a smaller multiple M. In step 525, the user determines at which multiple M to transmit to the base station.

Optionally, via path 526 following step 507, the base station may, in step 527, transmit to the user the probability of success for transmitting at different multiples M of the basic rate R. Thereafter, the user uses these probabilities to determine at which multiple M to transmit.

Figure 6:
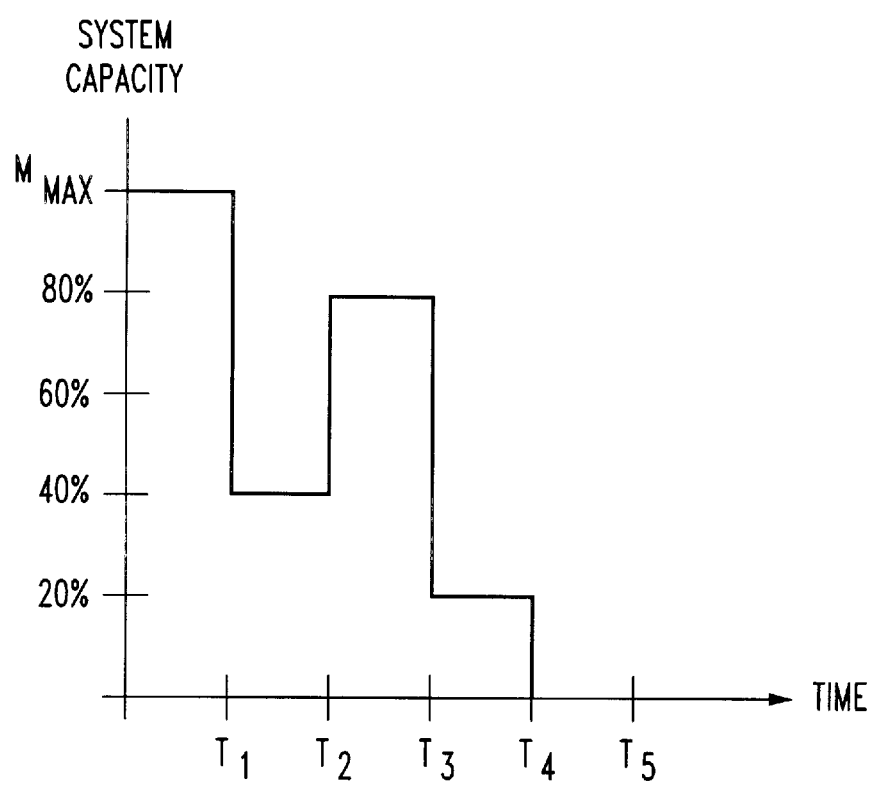
FIG. 6 shows an illustrative base station uplink load graph.

To illustrate how the base station handles a user request for additional transmission bandwidth, consider the base station uplink load graph shown in FIG. 6. Assume that a base station has a maximum bandwidth capacity of $M_{max}$ (e.g., 5) times the basic rate R. At time $T_1$ all of the bandwidth has been assigned; hence, any request from a user for an increased transmission bandwidth would be denied. At time $T_2$, however, only 40% of the bandwidth capacity is being utilized; at time $T_3$, 80%; at time $T_4$, 20%; and at time $T_5$, 0%.

At time $T_2$ assume an active user wants to increase its bandwidth by a multiple M=3 of its basic rate R. The base station could allow that user to utilize a multiple 3; however, the base station would then have no residual bandwidth capacity for newly active users or for increasing the bandwidth of existing active users. In such a situation, the base station would likely allow the requesting user to utilize a multiple M of 2 or 1, thereby leaving a reserve bandwidth for other needs of the system. Assuming the base station allows the user a multiple M=2, the new base station loading would appear as shown in time $T_3$ (assuming no other changes).

In a system which enables users to use a probabilistic approach, the base station would broadcast the uplink load shown in FIG. 6 to the users. At time $T_1$ a user can determine for itself what the probability of successful transmission would be at different transmission data rates. Certainly, a user wanting to increase its transmission data rate would determine that it would have a higher probability of success during time $T_2$ than at time $T_1$. Using the received uplink loading information shown in FIG. 6, it is likely that a user would vary its transmission data rate with time to optimally utilize the available bandwidth.

As previously discussed, the base station could also broadcast to the user the probability of a transmission success at different multiples M (not shown in FIG. 6). The user would then decide at which multiple M to transmit.

The above-described dynamic MC-CDMA assignment schemes provide a unique means for providing a user with variable and dynamic bandwidth capacity access in a wireless network. It provides access to the "peak capacity" of a base station to a single user, without losing traditional CDMA advantages in combating multi-path impairments.

Another feature of the proposed system enables a base station to support a mobile unit population that is much greater than the number of base station receivers which, in turn, is somewhat greater than the number of simultaneous mobile transmissions supported. In such a system, we can, for instance, classify users into two groups in order to reduce the number of receivers required at the base station. For high activity factor or delay-sensitive users, dedicated receivers as well as low-rate maintenance channels could be provided at the base station. Whereas low activity factor or non-delay-sensitive users may, instead, share receiver-oriented codes for burst access requests to get a receiver ready, prior to a transmission burst.

What has been described is merely illustrative of the application of the principles of the present invention. Other arrangements and methods can be implemented by those skilled in the art without departing from the spirit and scope of the present invention.

We claim:

1. A code division multiple access radio transmitter unit comprising means for receiving a digital bit stream from a user at one of a plurality of source bit rates and adjustable coding means, responsive to a user input selecting one of said plurality of source bit rates during an existing connection, for dynamically assigning one or more spreading codes for spreading and transmitting the user digital bit stream received at the selected bit rate to a channel bit rate which at least equals the highest bit rate of said plurality of source bit rates.

2. The code division multiple access radio transmitter unit of claim 1 wherein the one or more spreading codes include a primary code $C_1$ and additional codes $C_i$ which are derived from the primary code $C_1$ using $C_i=C_1 \times D_i$, where $D_i$ is orthogonal to $D_j$, for $i \neq j$ and such that $C_i$ is orthogonal to $C_j$.

3. The code division multiple access radio transmitter unit of claim 1 wherein said plurality of source bit rates includes a basic bit rate R and at least one other bit rate which is a multiple M of the basic bit rate R, where M is a number having an integer portion I greater than or equal to one and a fractional portion m, where 0<m<1, said user input selecting a particular user source bit rate by identifying a basic bit rate multiple M.

4. The code division multiple access radio transmitter unit of claim 1 wherein said adjustable coding means includes a serial-to-parallel means, responsive to a user's input identifying a basic bit rate multiple M, where M is a number having an integer portion I greater than or equal to one and a fractional portion m, where 0<m<1, for converting a received user bit stream, which is M times a basic bit rate R, into I+1 basic bit rate streams, wherein at least one of the I+1 basic bit rate streams can transmit at the fractional rate m, M encoder means for spreading each of the I+1 basic bit rate streams, using a different spreading code C, into I+1 channel bit rate signals, and means for combining the I+1 channel bit rate signals into one channel bit rate signal and modulating the channel signal onto a carrier signal for transmission from the code division multiple access radio transmitter unit.

5. A code division multiple access radio transmitter unit comprising means for receiving a digital bit stream from a user at one of a plurality of source bit rates, and adjustable coding means, responsive to a user input selecting one of said plurality of source bit rates, for dynamically assigning plural spreading codes for spreading and transmitting the user digital bit stream received at the selected bit rate to a channel bit rate which at least equals the highest bit rate of said plurality of source bit rates.

6. The code division multiple access radio transmitter unit of claim 5 wherein the plural spreading codes include a primary code $C_1$ and additional codes $C_i$ which are derived from the primary code $C_1$ using $C_i=C_1 \times D_i$, where $D_i$ is orthogonal to $D_j$, for $i \neq j$ and such that $C_i$ is orthogonal to $C_j$.

7. A code division multiple access radio transmitter unit comprising means for receiving a digital bit stream from a user at one of a plurality of source bit rates, adjustable coding means, responsive to a user input selecting one of said plurality of source bit rates, for assigning one or more spreading codes for spreading and transmitting the user digital bit stream received at the selected bit rate to a channel bit rate which at least equals the highest bit rate of said plurality of source bit rates; and wherein said plurality of source bit rates includes a bit rate which is a multiple M of the basic bit rate R, where M is a number having an integer portion I greater than or equal to one and a fractional portion m, where 0<m<1, said user input selecting a particular user source bit rate by identifying a basic bit rate multiple M.

8. A code division multiple access radio transmitter unit comprising means for receiving a digital bit stream from a user at one of a plurality of source bit rates, adjustable coding means, responsive to a user input selecting one of said plurality of source bit rates, for assigning one or more spreading codes for spreading and transmitting the user digital bit stream received at the selected bit rate to a channel bit rate which at least equals the highest bit rate of said plurality of source bit rates; and wherein said adjustable coding means includes a serial-to-parallel means, responsive to a user's input identifying a basic bit rate multiple M, where M is a number having an integer portion I greater than or equal to one and a fractional portion m, where 0<m<1, for converting a received user bit stream, which is M times a basic bit rate R, into I+1 basic bit rate streams, wherein at least one of the I+1 basic bit rate streams can transmit at the fractional rate m, M encoder means for spreading each of the I+1 basic bit rate streams, using a different spreading code C, into I+1 channel bit rate signals, and means for combining the I+1 channel bit rate signals into one channel bit rate signal and modulating the channel signal onto a carrier signal for transmission from the code division multiple access radio transmitter unit.

9. A method of providing code division multiple access for a radio transmitter unit, comprising the steps of receiving a digital bit stream from a user at one of a plurality of source bit rates and responsive to a user input selecting one of said plurality of source bit rates during an existing connection, dynamically assigning one or more spreading codes for spreading and transmitting the user digital bit stream received at the selected bit rate to a channel bit rate which at least equals the highest bit rate of said plurality of source bit rates.

10. The method of claim 9, including the step of deriving one or more spreading codes $C_i$ from a primary code $C_1$ using $C_i = C_1 \times D_i$, where $D_i$ is orthogonal to $D_j$, for $I \neq j$ and such that $C_i$ is orthogonal to $C_j$.

11. The method of claim 9, wherein said selecting one of said plurality of source bit rates includes identifying a basic bit rate multiple M, and said plurality of source bit rates includes a basic bit rate R and at least one other bit rate which is a multiple M of the basic bit rate R and where M is a number having an integer portion I greater than or equal to one and a fractional portion m, where 0<m<1.

12. The method of claim 9, including the step of identifying a basic bit rate multiple M, where M is a number having an integer portion I greater than or equal to one and a fractional portion m, where 0<m<1.

13. The method of claim 12 further comprising the step of converting said received user bit stream, which is M times a basic bit rate R, into I+1 basic bit streams.

14. The method of claim 13 further comprising the step of transmitting at least one of the I+1 bit rate streams at the fractional rate m.

15. The method of claim 14 further comprising the step of spreading each of the I+1 basic bit rate streams, using a different spreading code C, into I+1 channel bit rates.

16. The method of claim 15 further comprising the steps of combining the I+1 channel bit rates signals into one channel bit rate signal and modulating the channel signal onto a carrier signal for transmission from the code division multiple access radio transmitter unit.

* * * * *